(12) United States Patent
Suzuki et al.

(10) Patent No.: US 10,647,179 B2
(45) Date of Patent: May 12, 2020

(54) AIR-CONDITIONING APPARATUS FOR VEHICLES

(71) Applicant: SANDEN AUTOMOTIVE CLIMATE SYSTEMS CORPORATION, Isesaki-shi (JP)

(72) Inventors: Kenichi Suzuki, Isesaki (JP); Ryo Miyakoshi, Isesaki (JP); Kohei Yamashita, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 248 days.

(21) Appl. No.: 15/745,541

(22) PCT Filed: Jul. 1, 2016

(86) PCT No.: PCT/JP2016/069568
§ 371 (c)(1),
(2) Date: Jan. 17, 2018

(87) PCT Pub. No.: WO2017/014021
PCT Pub. Date: Jan. 26, 2017

(65) Prior Publication Data
US 2018/0354343 A1 Dec. 13, 2018

(30) Foreign Application Priority Data
Jul. 21, 2015 (JP) .................................. 2015-143787

(51) Int. Cl.
*B60H 1/00* (2006.01)
*B60H 1/22* (2006.01)
*B60H 1/32* (2006.01)

(52) U.S. Cl.
CPC ....... *B60H 1/2225* (2013.01); *B60H 1/00921* (2013.01); *B60H 1/3213* (2013.01); *B60H 2001/00957* (2013.01); *B60H 2001/3263* (2013.01); *B60H 2001/3272* (2013.01)

(58) Field of Classification Search
CPC .............. B60H 1/00921; B60H 1/2225; B60H 2001/327; B60H 2001/3272
See application file for complete search history.

(56) References Cited

U.S. PATENT DOCUMENTS

| 2010/0326127 | A1* | 12/2010 | Oomura | ............. | B60H 1/00785 62/498 |
| 2011/0016896 | A1* | 1/2011 | Oomura | ............. | B60H 1/00785 62/155 |
| 2013/0228324 | A1* | 9/2013 | Kim | ....................... | F25B 29/003 165/253 |

FOREIGN PATENT DOCUMENTS

| JP | 2014-213765 | 11/2014 |
| JP | 2014-231261 | 12/2014 |

* cited by examiner

*Primary Examiner* — Eric S Ruppert
(74) *Attorney, Agent, or Firm* — Cozen O'Connor (57) ABSTRACT

In an air-conditioning apparatus of a so-called heat pump system, wasteful power consumption to be generated when an auxiliary heating means is disposed on an air upstream side of a radiator is decreased, and comfortable heating of a vehicle interior is also achieved. The air-conditioning apparatus includes an electric heater 57 disposed on an upstream side of air flowing through an air flow passage 3 to a radiator 4, and a controller executes a cooperative operation of heating air to be supplied to the vehicle interior by the electric heater 57 and the radiator 4, and stops a compressor 2 on the basis of establishment of a condition that an inlet refrigerant temperature Tcxin of the radiator is lower than an outlet refrigerant temperature TCI of the radiator (Tcxin<TCI).

8 Claims, 7 Drawing Sheets

AIR-CONDITIONING APPARATUS FOR VEHICLES

RELATED APPLICATIONS

This is a U.S. National Phase Application under 35 USC 371 of International Application PCT/JP2016/069568 filed on Jul. 1, 2016.

This application claims the priority of Japanese application no. 2015-143787 filed Jul. 21, 2015, the entire content of which is hereby incorporated by reference.

FIELD OF THE INVENTION

Technical Field

The present invention relates to an air-conditioning apparatus of a heat pump system which conditions air of a vehicle interior, and more particularly, it relates to an air-conditioning apparatus which is applicable to a hybrid car and an electric vehicle.

Background Art

Due to actualization of environmental problems in recent years, hybrid cars and electric vehicles have spread. Then, as an air-conditioning apparatus which is applicable to such a vehicle, there has been developed an air-conditioning apparatus including a compressor to compress and discharge a refrigerant, a radiator disposed in an air flow passage through which air to be supplied to a vehicle interior flows, to let the refrigerant radiate heat, a heat absorber disposed in the air flow passage to let the refrigerant absorb heat, and an outdoor heat exchanger disposed outside the vehicle interior to let the refrigerant radiate heat or absorb heat, and there are changed and executed respective operation modes of a heating mode to let the refrigerant discharged from the compressor radiate heat in the radiator and let the refrigerant from which the heat has been radiated in this radiator absorb heat in the outdoor heat exchanger, a dehumidifying mode to let the refrigerant discharged from the compressor radiate heat in at least the radiator and let the refrigerant from which the heat has been radiated in the radiator absorb heat in at least the heat absorber, and a cooling mode to let the refrigerant discharged from the compressor radiate heat in the outdoor heat exchanger and let the refrigerant absorb heat in the heat absorber (e.g., see Patent Document 1).

Furthermore, in Patent Document 1, an auxiliary heating means constituted of an electric heater is disposed on an air upstream side of the radiator, and when a heating capability by the radiator runs short in the above heating mode, this auxiliary heating means (the electric heater) is energized to generate heat, thereby heating the air to be supplied from the air flow passage to the vehicle interior, to complement the heating capability (perform a cooperative operation of the radiator and the auxiliary heating means).

CITATION LIST

Patent Documents

Patent Document 1: Japanese Patent Application Publication No. 2014-213765

SUMMARY OF THE INVENTION

Problems to be Solved by the Invention

Here, in this type of air-conditioning apparatus for vehicles, a positive temperature coefficient (PTC) heater is often employed in such an auxiliary heating means as described above. The PTC heater is capable of exerting its performance more (a resistance value does not heighten) when a temperature of air flowing into the PTC heater is lower, due to its characteristics, and hence it is efficient to dispose the heater on an air upstream side of a radiator.

On one hand, when time of a heating operation of a vehicle interior elapses and frost grows on an outdoor heat exchanger, an efficiency of heat exchange with outdoor air deteriorates, an amount of heat to be absorbed from the outdoor air accordingly decreases, and a heating capability to be generated by the radiator also decreases. Furthermore, when an outdoor air temperature lowers, a density of a refrigerant to be sucked into a compressor decreases, and hence the heating capability to be generated by the radiator also decreases in this case. On the other hand, the auxiliary heating means (the PTC heater) generates heat to compensate for the decrease of the heating capability of the radiator as described above, and hence when the heating capability of the radiator decreases, there eventually occurs a case where a heating capability of the auxiliary heating means becomes larger than the heating capability of the radiator.

Figure 6:
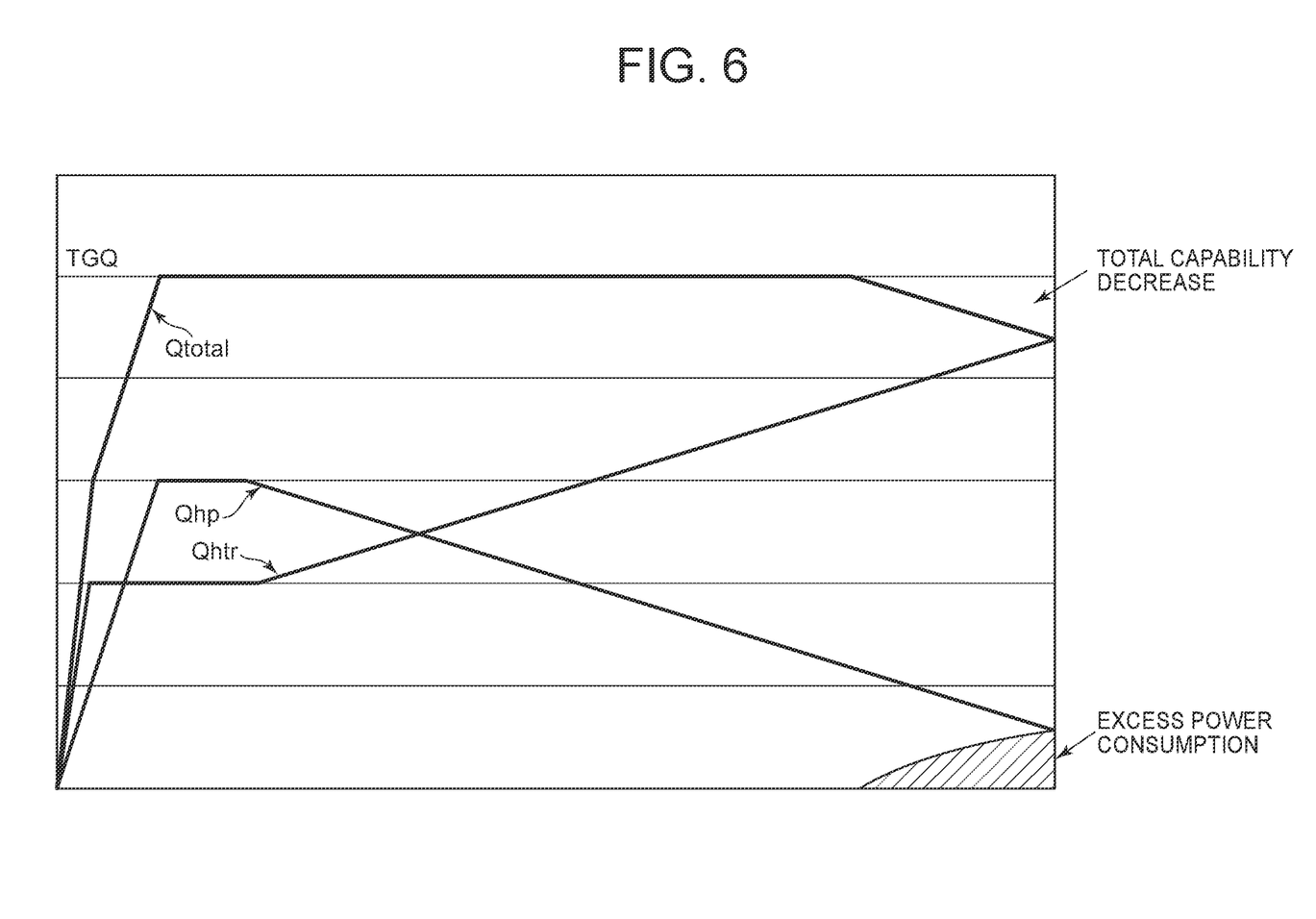
FIG. 6 is a diagram to explain a situation where the heat absorbing phenomenon occurs in the radiator.

This behavior will be described with reference to FIG. 6 and FIG. 7. In FIG. 6, TGQ is a required heating capability that is the heating capability to be required for the radiator, and Qhp is the heating capability (HP capability) to be generated by the radiator. Qhtr is an auxiliary heating capability to be generated by the auxiliary heating means, and Qtotal is a total capability (Qtotal=Qhp+Qhtr) that is a sum of the heating capability Qhp of the radiator and the auxiliary heating capability Qhtr of the auxiliary heating means.

In an early stage of an operation of a heating mode, frosting of an outdoor heat exchanger or the like does not occur. Therefore, as shown on the left side of FIG. 7, the sum of the heating capability Qhp of the radiator and the auxiliary heating capability Qhtr of the auxiliary heating means becomes the total capability Qtotal, which is controlled by the compressor or the auxiliary heating means to satisfy the required heating capability TGQ.

However, when the heating capability Qhp of the radiator comes to decrease due to such factors as described above, the auxiliary heating capability Qhtr of the auxiliary heating means eventually exceeds the heating capability Qhp of the radiator as shown in FIG. 6. Then, in such a situation, there occurs a phenomenon where the total capability Qtotal decreases as shown at the right end of FIG. 6. The reason is that, when the auxiliary heating means is disposed on the air upstream side of the radiator, air heated by the auxiliary heating means flows into the radiator, and hence the radiator does not radiate any heat but conversely absorbs the heat from the air.

Figure 7:
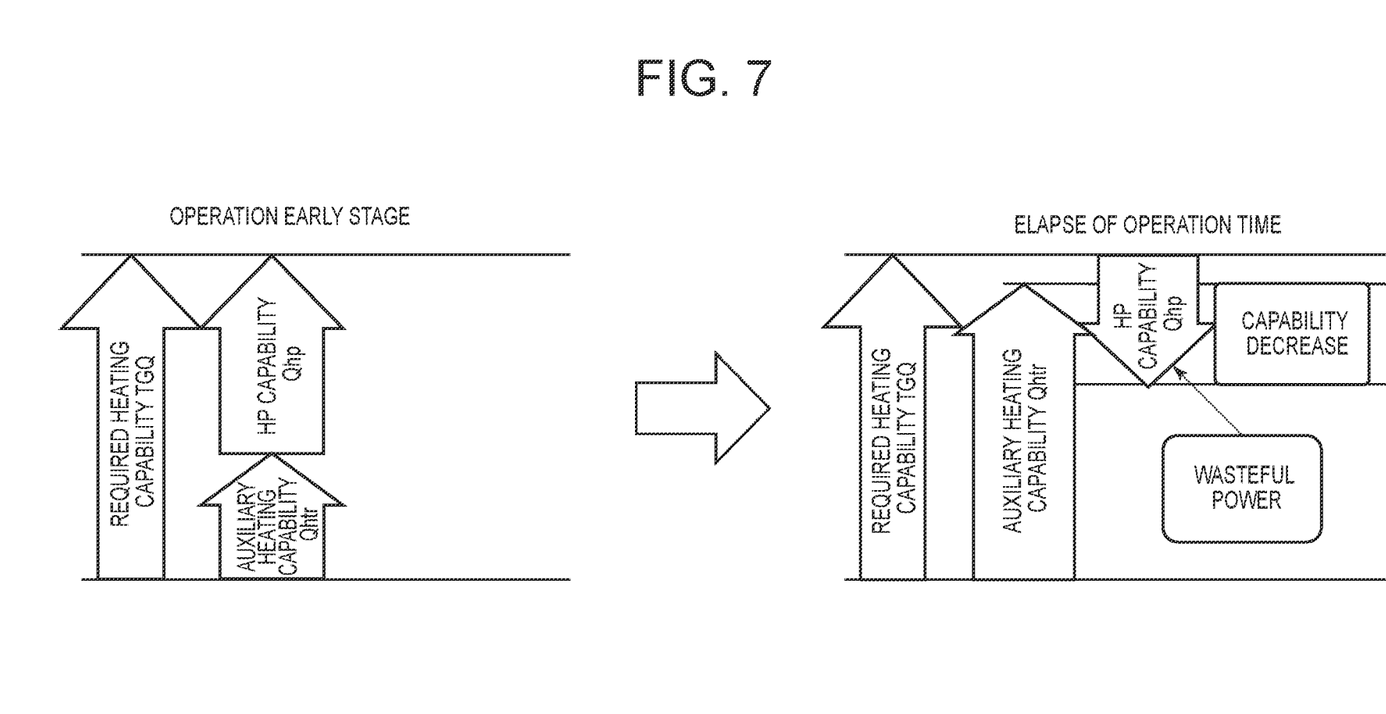
FIG. 7 is a diagram to explain a relation between respective capabilities when the heat absorbing phenomenon occurs in the radiator.

When the radiator falls in a situation of absorbing the heat in this manner (the heat absorbing phenomenon of the radiator), the total capability Qtotal decreases as shown on the right side of FIG. 7, and cannot satisfy the required heating capability TGQ, and the vehicle interior cannot comfortably be heated. Furthermore, power of the compressor to generate the heating capability of the radiator is wasted, and excessive power is consumed (excess power consumption shown in FIG. 6).

The present invention has been developed to solve such a conventional technical problem, and an object thereof is to decrease wasteful power consumption to be generated especially when an auxiliary heating means is disposed on an air upstream side of a radiator and also achieve comfortable heating of a vehicle interior in an air-conditioning apparatus of a so-called heat pump system.

Means for Solving the Problems

An air-conditioning apparatus for vehicles of the invention of claim 1 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior, and the air-conditioning apparatus for the vehicles includes an auxiliary heating means disposed on an upstream side of the air flowing through the air flow passage to the radiator, and is characterized in that the control means executes a cooperative operation of heating the air to be supplied to the vehicle interior by the auxiliary heating means and the radiator, and stops the compressor on the basis of establishment of a condition that an inlet refrigerant temperature Tcxin of the radiator is lower than an outlet refrigerant temperature TCI of the radiator (Tcxin<TCI).

An air-conditioning apparatus for vehicles of the invention of claim 2 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior, and the air-conditioning apparatus for the vehicles includes an auxiliary heating means disposed on an upstream side of the air flowing through the air flow passage to the radiator, and is characterized in that the control means executes a cooperative operation of heating the air to be supplied to the vehicle interior by the auxiliary heating means and the radiator, and stops the compressor on the basis of establishment of a condition that a difference between a total capability Qtotal that is a total heating capability to be generated by the radiator and the auxiliary heating means and an auxiliary heating capability Qhtr that is a heating capability to be generated by the auxiliary heating means is smaller than a predetermined value X1 ((Qtotal−Qhtr)<the predetermined value X1).

An air-conditioning apparatus for vehicles of the invention of claim 3 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior, and the air-conditioning apparatus for the vehicles includes an auxiliary heating means disposed on an upstream side of the air flowing through the air flow passage to the radiator, and is characterized in that the control means executes a cooperative operation of heating the air to be supplied to the vehicle interior by the auxiliary heating means and the radiator, and stops the compressor on the basis of establishment of a condition that a ratio of a difference (Qtotal−Qhtr) between a total capability Qtotal that is a total heating capability to be generated by the radiator and the auxiliary heating means and an auxiliary heating capability Qhtr that is a heating capability to be generated by the auxiliary heating means to a power consumption Php of the compressor is smaller than a predetermined value X2 ((Qtotal−Qhtr)/Php<X2).

An air-conditioning apparatus for vehicles of the invention of claim 4 includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior, and the air-conditioning apparatus for the vehicles includes an auxiliary heating means disposed on an upstream side of the air flowing through the air flow passage to the radiator, and is characterized in that the control means executes a cooperative operation of heating the air to be supplied to the vehicle interior by the auxiliary heating means and the radiator, and stops the compressor on the basis of establishment of one of a condition that an inlet refrigerant temperature Tcxin of the radiator is lower than an outlet refrigerant temperature TCI of the radiator (Tcxin<TCI), a condition that a difference between a total capability Qtotal that is a total heating capability to be generated by the radiator and the auxiliary heating means and an auxiliary heating capability Qhtr that is a heating capability to be generated by the auxiliary heating means is smaller than a predetermined value X1 ((Qtotal−Qhtr)<the predetermined value X1), and a condition that a ratio of a difference (Qtotal−Qhtr) between the total capability Qtotal that is the total heating capability to be generated by the radiator and the auxiliary heating means and the auxiliary heating capability Qhtr that is the heating capability to be generated by the auxiliary heating means to a power consumption Php of the compressor is smaller than a predetermined value X2 ((Qtotal−Qhtr)/Php<X2), or any combination of the conditions.

The air-conditioning apparatus for the vehicles of the invention of claim 5 is characterized in that in the above respective inventions, the auxiliary heating means is a PTC heater.

The air-conditioning apparatus for the vehicles of the invention of claim 6 is characterized in that in the above respective inventions, in the cooperative operation, the control means compares a required heating capability TGQ that is a heating capability to be required for the radiator with a heating capability Qhp to be generated by the radiator, and complements a shortage of the heating capability Qhp to the required heating capability TGQ with the heating of the auxiliary heating means.

The air-conditioning apparatus for the vehicles of the invention of claim 7 is characterized in that in the above respective inventions, the control means stops the compressor, when a state where the condition is established continues for a predetermined time.

The air-conditioning apparatus for the vehicles of the invention of claim 8 is characterized in that in the above respective inventions, the control means does not judge the establishment of the condition in an early stage on startup of the compressor.

The air-conditioning apparatus for the vehicles of the invention of claim 9 is characterized in that in the above invention, the control means does not judge the establishment of the condition until a predetermined time elapses after the startup of the compressor.

Advantageous Effect of the Invention

According to the invention of claim 1, an air-conditioning apparatus for vehicles includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior. In the air-conditioning apparatus for the vehicles, an auxiliary heating means is disposed on an upstream side of the air flowing through the air flow passage to the radiator, and the control means executes a cooperative operation of heating the air to be supplied to the vehicle interior by the auxiliary heating means and the radiator, and stops the compressor on the basis of establishment of a condition that an inlet refrigerant temperature Tcxin of the radiator is lower than an outlet refrigerant temperature TCI of the radiator (Tcxin<TCI).

Here, when the inlet refrigerant temperature Tcxin of the radiator is lower than the outlet refrigerant temperature TCI of the radiator, it is indicated that a heat absorbing phenomenon occurs in the radiator. In the invention of claim 1, the control means stops the compressor on the basis of the establishment of the condition (Tcxin<TCI). Consequently, when a heating capability of the radiator decreases and the radiator falls in a situation of conversely absorbing heat from the air heated by the auxiliary heating means, the control means stops the compressor to eliminate the disadvantage that more power is wasted. Furthermore, a temperature of the air heated by the auxiliary heating means does not drop, and hence comfortable heating of the vehicle interior is also acquired.

In the invention of claim 2, an air-conditioning apparatus for vehicles includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior. In the air-conditioning apparatus for the vehicles, an auxiliary heating means is disposed on an upstream side of the air flowing through the air flow passage to the radiator, and the control means executes a cooperative operation of heating the air to be supplied to the vehicle interior by the auxiliary heating means and the radiator, and stops the compressor on the basis of establishment of a condition that a difference between a total capability Qtotal that is a total heating capability to be generated by the radiator and the auxiliary heating means and an auxiliary heating capability Qhtr that is a heating capability to be generated by the auxiliary heating means is smaller than a predetermined value X1 ((Qtotal−Qhtr)<X1).

Here, when the difference between the total capability Qtotal and the auxiliary heating capability Qhtr is smaller than the predetermined value X1, it is indicated that the heating capability to be generated by the radiator decreases, and there is a high possibility that the heat absorbing phenomenon occurs in the radiator. In the invention of claim 2, the control means stops the compressor on the basis of the establishment of the condition ((Qtotal−Qhtr)<X1). Therefore, when the heating capability of the radiator decreases and there is a high risk that the radiator falls in a situation of conversely absorbing heat from the air heated by the auxiliary heating means, the control means stops the compressor to eliminate the disadvantage that more power is wasted. Furthermore, the temperature of the air heated by the auxiliary heating means similarly does not drop, and the comfortable heating of the vehicle interior is also acquired.

In the invention of claim 3, an air-conditioning apparatus for vehicles includes a compressor to compress a refrigerant, an air flow passage through which air to be supplied to a vehicle interior flows, a radiator disposed in this air flow passage to let the refrigerant radiate heat, thereby heating the air to be supplied to the vehicle interior, an outdoor heat exchanger disposed outside the vehicle interior to let the refrigerant absorb heat, and a control means, so that this control means lets the refrigerant discharged from the compressor radiate heat in the radiator, decompresses the refrigerant from which the heat has been radiated, and then lets the refrigerant absorb heat in the outdoor heat exchanger to heat the vehicle interior. In the air-conditioning apparatus for the vehicles, an auxiliary heating means is disposed on an upstream side of the air flowing through the air flow passage to the radiator, and the control means executes a cooperative operation of heating the air to be supplied to the vehicle interior by the auxiliary heating means and the radiator, and stops the compressor on the basis of establishment of a condition that a ratio of a difference (Qtotal−Qhtr) between a total capability Qtotal that is a total heating capability to be generated by the radiator and the auxiliary heating means and an auxiliary heating capability Qhtr that is a heating capability to be generated by the auxiliary heating means to a power consumption Php of the compressor is smaller than a predetermined value X2 ((Qtotal−Qhtr)/Php<X2).

Here, the ratio of the difference (Qtotal−Qhtr) between the total capability Qtotal and the auxiliary heating capability Qhtr to the power consumption Php of the compressor means a coefficient of performance (COP) of the compressor. When this ratio is smaller than the predetermined value X2, it is indicated that the heating capability to be generated by the radiator decreases and there is similarly the high possibility that the heat absorbing phenomenon occurs in the radiator. In the invention of claim 3, the control means stops the compressor on the basis of the establishment of the condition ((Qtotal−Qhtr)/Php<X2). Therefore, when the heating capability of the radiator decreases and there is a high risk that the radiator falls in the situation of conversely absorbing heat from the air heated by the auxiliary heating means, the control means stops the compressor to eliminate the disadvantage that more power is wasted. Furthermore, the temperature of the air heated by the auxiliary heating means similarly does not drop, and the comfortable heating of the vehicle interior is also acquired.

In the invention of claim 4, the control means stops the compressor on the basis of establishment of one or any combination of the conditions of claim 1 to claim 3. Consequently, the control means more securely judges that the heating capability of the radiator decreases and that the radiator falls in the situation of conversely absorbing the heat from the air heated by the auxiliary heating means, and stops the compressor to eliminate the disadvantage that more power is wasted. Furthermore, the temperature of the air heated by the auxiliary heating means similarly does not drop, and the comfortable heating of the vehicle interior can be acquired.

The above inventions are effective especially in the case of using a PTC heater as the auxiliary heating means to be disposed on the air upstream side of the radiator as in the invention of claim 5 and in the case of performing the cooperative operation in which the control means compares a required heating capability TGQ that is a heating capability to be required for the radiator with a heating capability Qhp to be generated by the radiator, and complements a shortage of the heating capability Qhp to the required heating capability TGQ with the heating of the auxiliary heating means as in the invention of claim 6.

Furthermore, as in the invention of claim 7, the control means stops the compressor, when a state where the condition is established continues for a predetermined time. Consequently, the control means can abolish erroneous judgment due to temporary variation, more accurately judge that the heating capability of the radiator decreases and that the radiator falls in the situation of conversely absorbing heat from the air heated by the auxiliary heating means, and stop the compressor.

Additionally, as in the invention of claim 8, the control means does not judge the establishment of the condition in an early stage on startup of the compressor, and for example, as in the invention of claim 9, the control means does not judge the establishment of the condition until a predetermined time elapses after the startup of the compressor. Consequently, it is possible to abolish the erroneous judgment in a situation where an operation state noticeably varies, and it is possible to more accurately judge the occurrence of the heat absorbing phenomenon by the radiator.

MODE FOR CARRYING OUT THE INVENTION

Hereinafter, description will be made as to embodiments of the present invention in detail with reference to the drawings.

Figure 1:
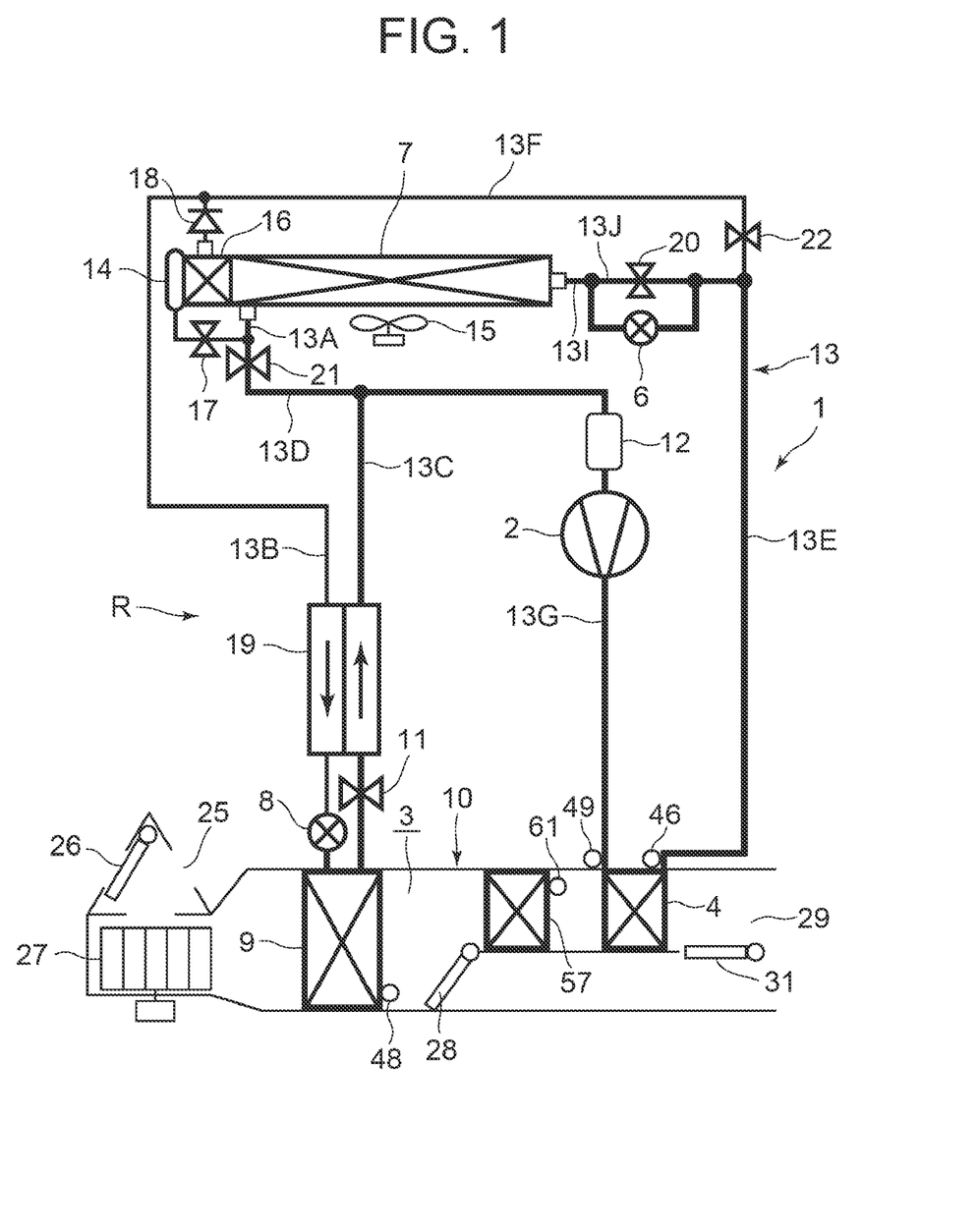
FIG. 1 is a constitutional view of an air-conditioning apparatus for vehicles of one embodiment to which the present invention is applied.

FIG. 1 shows a constitutional view of an air-conditioning apparatus for vehicles 1 of one embodiment of the present invention. The vehicle of the embodiment to which the present invention is applied is an electric vehicle (EV) in which an engine (an internal combustion engine) is not mounted, and runs with an electric motor for running which is driven by power charged in a battery (which is not shown in the drawing), and the air-conditioning apparatus for the vehicles 1 of the present invention is also driven by the power of the battery. Specifically, in the electric vehicle which is not capable of performing heating by engine waste heat, the air-conditioning apparatus for the vehicles 1 of the embodiment performs heating by a heat pump operation in which a refrigerant circuit is used, and furthermore, the conditioning apparatus selectively executes respective operation modes of dehumidifying and heating, dehumidifying and cooling, cooling and others.

It is to be noted that the vehicle is not limited to the electric vehicle, and the present invention is also effective for a so-called hybrid car in which the engine is used together with the electric motor for running. Furthermore, needless to say, the present invention is also applicable to a usual car which runs with the engine.

The air-conditioning apparatus for the vehicles 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to let the high-temperature high-pressure refrigerant discharged from the compressor 2 and flowing inside via a refrigerant pipe 13G radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 disposed in the air flow passage 3 to let the refrigerant absorb heat from interior and exterior of the vehicle during the cooling and during the dehumidifying, an evaporation capability control valve 11 to control an evaporation capability in the heat absorber 9, an accumulator 12, and others, thereby constituting a refrigerant circuit R. It is to be noted that an outdoor blower 15 is provided in the outdoor heat exchanger 7. The outdoor blower 15 forcibly passes the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (an opening/closing valve) 17 to be opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11. It is to be noted that the evaporation capability control valve 11 may be disposed on a refrigerant downstream side of the internal heat exchanger 19.

Additionally, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (an opening/closing valve) 21 to be opened during the heating. In addition, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (an opening/closing valve) 22 to be opened during the dehumidifying.

Furthermore, the outdoor expansion valve 6 is connected in parallel with a bypass pipe 13J, and in the bypass pipe 13J, a solenoid valve (an opening/closing valve) 20 is interposed to open in a cooling mode so that the refrigerant bypasses the outdoor expansion valve 6 to flow. It is to be noted that a pipe between the outdoor expansion valve 6 and the solenoid valve 20, and the outdoor heat exchanger 7 is denoted with 131.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, 57 denotes an electric heater 57 as an auxiliary heating means disposed in the air-conditioning apparatus for the vehicles 1 of the embodiment. The electric heater 57 is constituted of a positive temperature coefficient (PTC) heater in the embodiment, and disposed in the air flow passage 3 on an upstream side of air flowing through the air flow passage 3 to the radiator 4. Then, when the electric heater 57 is energized to generate heat, the air in the air flow passage 3 which flows through the heat absorber 9 into the electric heater 57 is heated to flow into the radiator 4 on a downstream side. That is, the electric heater 57 becomes a so-called heater core to complement heating of the vehicle interior. It is to be noted that the reason why the electric heater 57 constituted of the PTC heater is disposed on the air upstream side of the radiator 4 has already been mentioned.

Additionally, in the air flow passage 3 on the air upstream side of the electric heater 57, an air mix damper 28 is disposed to adjust a degree at which the indoor air or outdoor air flows through the radiator 4. Further in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
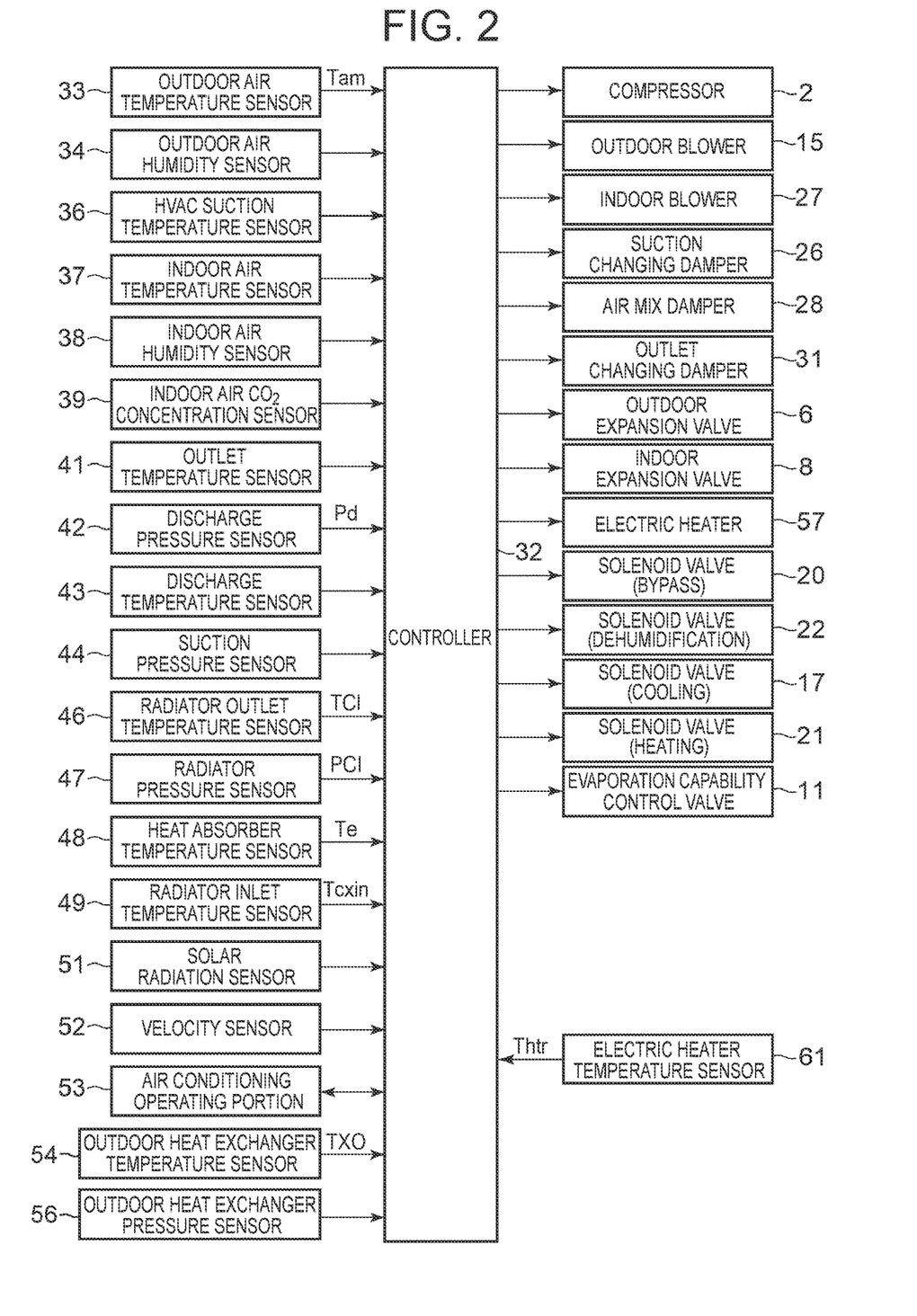
FIG. 2 is a block diagram of an electric circuit of a controller of the air-conditioning apparatus for the vehicles of FIG. 1.

Next, in FIG. 2, 32 is a controller (ECU) as a control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure Pd of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a radiator outlet temperature sensor 46 which detects a refrigerant temperature (an outlet refrigerant temperature TCI) in an outlet of the radiator 4, a radiator inlet temperature sensor 49 which detects a refrigerant temperature (an inlet refrigerant temperature Tcxin) in an inlet of the radiator 4, a radiator pressure sensor 47 which detects a refrigerant pressure PCI of the radiator 4, a heat absorber temperature sensor 48 which detects a temperature Te of the heat absorber 9, a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature TXO of the outdoor heat exchanger 7, and an outdoor heat exchanger pressure sensor 56 which detects a refrigerant pressure of the outdoor heat exchanger 7. Furthermore, the input of the controller 32 is further connected to an output of an electric heater temperature sensor 61 which detects a temperature Thtr of the electric heater 57.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the electric heater 57, and the evaporation capability control valve 11. Then, the controller 32 controls these components on the basis of the outputs of the respective sensors and the setting input by the air conditioning operating portion 53.

Next, description will be made as to an operation of the air-conditioning apparatus for the vehicles 1 of the embodiment having the above constitution. In the embodiment, the controller 32 changes and executes respective roughly divided operation modes of a heating mode, a dehumidifying and heating mode, an internal cycle mode, a dehumidifying and cooling mode, and the cooling mode. Description will initially be made as to a flow of the refrigerant in each operation mode.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Then, the controller operates the compressor 2 and the respective blowers 15 and 27, and the air mix damper 28 has a state of passing the air blown out from the indoor blower 27 through the electric heater 57 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 heats by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. Additionally, description will be made later as to energization control and operation of the electric heater 57. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13D and the solenoid valve 21, and flows from the refrigerant pipe 13C into the accumulator 12 to perform gas-liquid separation, and the gas refrigerant is sucked into the compressor 2, thereby repeating this circulation. The air heated in the electric heater 57 and the radiator 4 is blown out from the outlet 29, thereby performing the heating of the vehicle interior.

The controller 32 controls a number of revolution of the compressor 2 on the basis of a high pressure of the refrigerant circuit R which is detected by the discharge pressure sensor 42 or the radiator pressure sensor 47, and the controller controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4. Description will be made later as to control of the compressor 2 and the outdoor expansion valve 6 in this heating mode.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution of the compressor 2 on the basis of the high pressure of the refrigerant circuit R which is detected by the discharge pressure sensor 42 or the radiator pressure sensor 47, and the controller controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shutoff position), and also closes the solenoid valves 21 and 17. The outdoor expansion valve 6 and the solenoid valves 21 and 17 are closed, thereby obstructing inflow of the refrigerant into the outdoor heat exchanger 7 and outflow of the refrigerant from the outdoor heat exchanger 7, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a combination of the heat absorption in the heat absorber 9 and a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 and the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix damper 28 has the state of passing the air blown out from the indoor blower 27 through the electric heater 57 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls the refrigerant pressure (the radiator pressure PCI) of the radiator 4.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully opened position (the valve position is an upper limit of controlling)), and the air mix damper 28 has a state where the air does not pass through the electric heater 57 and the radiator 4 or a state of controlling a volume of the air to be passed. In consequence, the high-temperature high-pressure gas refrigerant discharged from the compressor 2 flows into the radiator 4. The air in the air flow passage 3 does not pass through the radiator 4 or only slightly passes, and the refrigerant flowing out from the radiator 4 flows through the refrigerant pipe 13E to reach the solenoid valve 20 and the outdoor expansion valve 6.

At this time, the solenoid valve 20 opens, and hence the refrigerant bypasses the outdoor expansion valve 6 to pass the bypass pipe 13J, and flows into the outdoor heat exchanger 7 as it is, in which the refrigerant is cooled by the running therein or the outdoor air to pass through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4, but is blown out from the outlet 29 to the vehicle interior, thereby performing the cooling of the vehicle interior. In this cooling mode, the controller 32 controls the number of revolution of the compressor 2 on the basis of the temperature of the heat absorber 9 which is detected by the heat absorber temperature sensor 48.

(6) Control of Compressor 2 and Outdoor Expansion Valve 6 in Heating Mode and Heating Complementation by Electric Heater 57 in Heating Mode Next, description will be made as to the control of the compressor 2 and the outdoor expansion valve 6 in the above heating mode, and heating complementing control by the electric heater 57 in the heating mode.

(6-1) Basic Control of Compressor 2 and Outdoor Expansion Valve 6

The controller 32 calculates a target outlet temperature TAO from Equation (I) mentioned below. The target outlet temperature TAO is a target value of the temperature of the air to be blown out from the outlet 29 to the vehicle interior.

$$TAO = (Tset - Tin) \times K + Tbal(f(Tset, SUN, Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature becomes.

The controller 32 calculates a radiator target temperature TCO from the target outlet temperature TAO, and next calculates a radiator target pressure PCO on the basis of the radiator target temperature TCO. Then, the controller 32 calculates a number of revolution Nc of the compressor 2 on the basis of the radiator target pressure PCO and the refrigerant pressure (the radiator pressure) PCI of the radiator 4 which is detected by the radiator pressure sensor 47, and the controller operates the compressor 2 at the number of revolution Nc. Specifically, the controller 32 controls the refrigerant pressure (the radiator pressure) PCI of the radiator 4 in accordance with the number of revolution Nc of the compressor 2.

Furthermore, the controller 32 calculates a radiator target subcool degree TGSC of the radiator 4 on the basis of the target outlet temperature TAO. On the other hand, the controller 32 calculates a subcool degree (a radiator subcool degree SC) of the refrigerant in the radiator 4 on the basis of the radiator pressure PCI and the temperature (radiator temperature TCI) of the radiator 4 which is detected by the radiator temperature sensor 46. Then, the controller calculates a valve target position (an outdoor expansion valve target position TGECCV) of the outdoor expansion valve 6 on the basis of the radiator subcool degree SC and the radiator target subcool degree TGSC. Then, the controller 32 controls the valve position of the outdoor expansion valve 6 into the outdoor expansion valve target position TGECCV.

The controller 32 performs the calculation to increase the radiator target subcool degree TGSC as the target outlet temperature TAO is higher, but the present invention is not limited to this example, and the controller may perform the calculation on the basis of an after-mentioned difference (a capability difference) between a required heating capability TGQ and a heating capability Qhp, the radiator pressure PCI, or a difference (a pressure difference) between the radiator target pressure PCO and the radiator pressure PCI. In this case, the controller 32 decreases the radiator target subcool degree TGSC as the capability difference is smaller, as the pressure difference is smaller, as the volume of the air of the indoor blower 27 is smaller, or as the radiator pressure PCI is smaller.

(6-2) Control (Heating Complementation) of Electric Heater 57 (Auxiliary Heating Means)

Furthermore, when the controller 32 judges that the heating capability by the radiator 4 runs short in this heating mode, the controller energizes the electric heater 57 to generate heat, thereby heating the air in the air flow passage 3 which flows into the radiator 4. In this case, the controller 32 calculates the required heating capability TGQ that is a heating capability to be required for the radiator 4 and the heating capability Qhp to be generated by the radiator 4 by use of Equation (II) and Equation (III).

$$TGQ=(TCO-Te) \times Cpa \times \rho \times Qair \qquad (II)$$

$$Qhp=f(Tam, Nc, BLV, VSP, FANVout, Te) \qquad (III)$$

Here, Te is the temperature of the heat absorber 9 which is detected by the heat absorber temperature sensor 48, Cpa is specific heat [kj/kg·K] of the air flowing into the radiator 4, $\rho$ is a density (a specific volume) [kg/m$^3$] of the air flowing into the radiator 4, Qair is the volume [m$^3$/h] of the air to pass the radiator 4 (which is estimated from a blower voltage BLV of the indoor blower 27, or the like), VSP is the velocity obtainable from the velocity sensor 52, and FANVout is a voltage of the outdoor blower 15.

It is to be noted that in Equation (II), in place of or in addition to Qair, there may be employed a temperature of the air flowing into the radiator 4 or a temperature of the air flowing out from the radiator 4. Furthermore, the number of revolution Nc of the compressor 2 of Equation (III) is one example of an index indicating a refrigerant flow rate, the blower voltage BLV is one example of an index indicating the volume of the air in the air flow passage 3, and the heating capability Qhp to be generated by the radiator 4 is calculated from a function of these indexes. Furthermore, the voltage FANVout of the outdoor blower 15 is an index indicating the volume of the air to pass the outdoor heat exchanger 7 during stop of the vehicle (when VSP is 0). Additionally, Qhp may be calculated from one of these indexes, an outlet refrigerant pressure of the radiator 4, the outlet refrigerant temperature TCI of the radiator 4, an inlet refrigerant pressure of the radiator 4 and the inlet refrigerant temperature Tcxin of the radiator 4, or any combination thereof.

Then, the controller 32 judges whether or not the required heating capability TGQ calculated by using Equation (II) mentioned above is larger than the heating capability Qhp to be generated by the radiator 4 which is calculated by using Equation (III). Furthermore, when the heating capability Qhp of the radiator 4 is sufficient for the required heating capability TGQ, the controller stops the energization of the electric heater 57, and operates the compressor 2 and another device of the refrigerant circuit R so that the radiator 4 generates the required heating capability TGQ.

On the other hand, when the heating capability Qhp to be generated by the radiator 4 runs short to the required heating capability TGQ, the controller 32 executes a cooperative operation of the radiator 4 and the electric heater 57 of the refrigerant circuit R. Specifically, the controller 32 energizes the electric heater 57, thereby starting heating by the electric heater 57 in addition to the heating by the radiator 4 of the refrigerant circuit R.

At this time, the controller 32 calculates a required heating capability TGQhtr of the electric heater 57=the required heating capability TGQ–the heating capability Qhp on the basis of the output of the electric heater temperature sensor 61, and controls the energization of the electric heater 57 so that the auxiliary heating capability Qhtr to be generated by the electric heater 57 reaches the required heating capability TGQhtr. Specifically, the controller 32 complements a shortage of the heating capability Qhp to be generated by the radiator 4 to the required heating capability TGQ with the heating by the electric heater 57 (the auxiliary heating capability Qhtr). Consequently, comfortable vehicle interior heating is achievable, and it is also possible to inhibit frosting of the outdoor heat exchanger 7.

Furthermore, the controller executes the heating by the electric heater 57 in a situation where the heating capability by the radiator 4 runs short, and hence it is possible to minimize deterioration of an efficiency which accompanies the operation of the electric heater 57. In consequence, it is possible to effectively suppress the disadvantage that a cruising distance decreases in such an electric vehicle as in the embodiment.

(6-3) Operation of judging Occurrence of Heat Absorbing Phenomenon in Radiator 4 and Control of Compressor 2 (No. 1)

Next, description will be made as to an operation of judging occurrence of a heat absorbing phenomenon in the radiator 4 and control of the compressor 2 in this case, with reference to FIG. 3. In a case where operation time of the heating mode elapses and frost grows on the outdoor heat exchanger 7, or the like, an efficiency of heat exchange with the outdoor air deteriorates, and hence an amount of heat to be absorbed from the outdoor air decreases. Therefore, the heating capability Qhp to be generated by the radiator 4 also decreases as described above.

On the other hand, the electric heater 57 generates heat to compensate for such decrease of the heating capability Qhp of the radiator 4 as described above. Therefore, when the heating capability Qhp of the radiator 4 decreases, the auxiliary heating capability Qhtr of the electric heater 57 eventually becomes larger than the heating capability Qhp of the radiator 4, the air heated with the large auxiliary heating capability Qhtr flows into the radiator 4, and hence there eventually occurs a phenomenon where the radiator 4 does not radiate heat but conversely absorbs heat.

Here, when the radiator 4 radiates heat, the outlet refrigerant temperature TCI is lower than the inlet refrigerant temperature Tcxin. However, when the radiator 4 absorbs heat, the inlet refrigerant temperature Tcxin is lower than the outlet refrigerant temperature TCI. In the embodiment, the controller 32 monitors the inlet refrigerant temperature Tcxin (a broken line of FIG. 3) of the radiator 4 and the outlet refrigerant temperature TCI (a solid line of FIG. 3) which are detected by the radiator inlet temperature sensor 49 and the radiator outlet temperature sensor 46, and the controller always judges whether or not a condition (Tcxin<TCI) is established in the heating mode.

Figure 3:
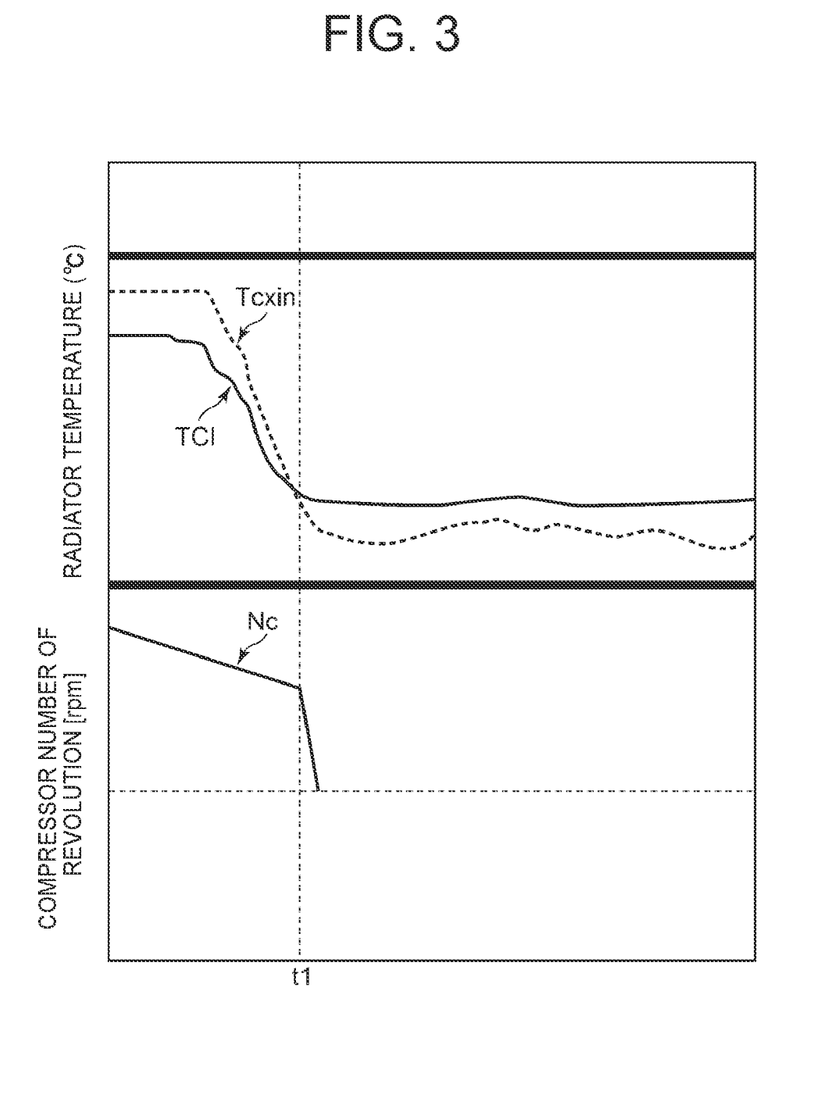
FIG. 3 is a diagram to explain an operation of judging occurrence of a heat absorbing phenomenon in a radiator which is to be performed by the controller of FIG. 2.

Then, for example, when this condition (Tcxin<TCI) is established at time t1 of FIG. 3, the controller 32 judges that the heat absorbing phenomenon occurs in the radiator 4, to stop the compressor 2 (Nc=0). Afterward, the controller defines the required heating capability TGQhtr of the electric heater 57=the required heating capability TGQ, and the controller controls the energization of the electric heater 57 so that the auxiliary heating capability Qhtr to be generated by the electric heater 57 reaches the required heating capability TGQhtr.

In this example, when the condition (Tcxin<TCI) that the inlet refrigerant temperature Tcxin of the radiator 4 is lower than the outlet refrigerant temperature TCI of the radiator 4 is established as described above, the controller 32 judges that the heat absorbing phenomenon occurs in the radiator 4, to stop the compressor 2. Therefore, when the heating capability of the radiator 4 decreases and the radiator 4 falls in a situation of conversely absorbing heat from the air heated by the electric heater 57, the controller stops the compressor 2 to eliminate the disadvantage that more power is wasted. Furthermore, a temperature of the air heated by the electric heater 57 does not drop, and comfortable heating of the vehicle interior is acquired.

It is to be noted that the controller 32 starts the compressor 2 again to return to the cooperative operation by the radiator 4 and the electric heater 57, when predetermined return conditions are established, for example, in a case where defrosting of the outdoor heat exchanger 7 is performed, in a case where a predetermined time elapses after the compressor 2 is stopped, in a case where the outdoor air temperature rises after the compressor is stopped and it is presumed that a frosting state is eliminated, or the like (this also applies to the following examples).

(6-4) Operation of judging Occurrence of Heat Absorbing Phenomenon in Radiator 4 and Control of Compressor 2 (No. 2)

Figure 4:
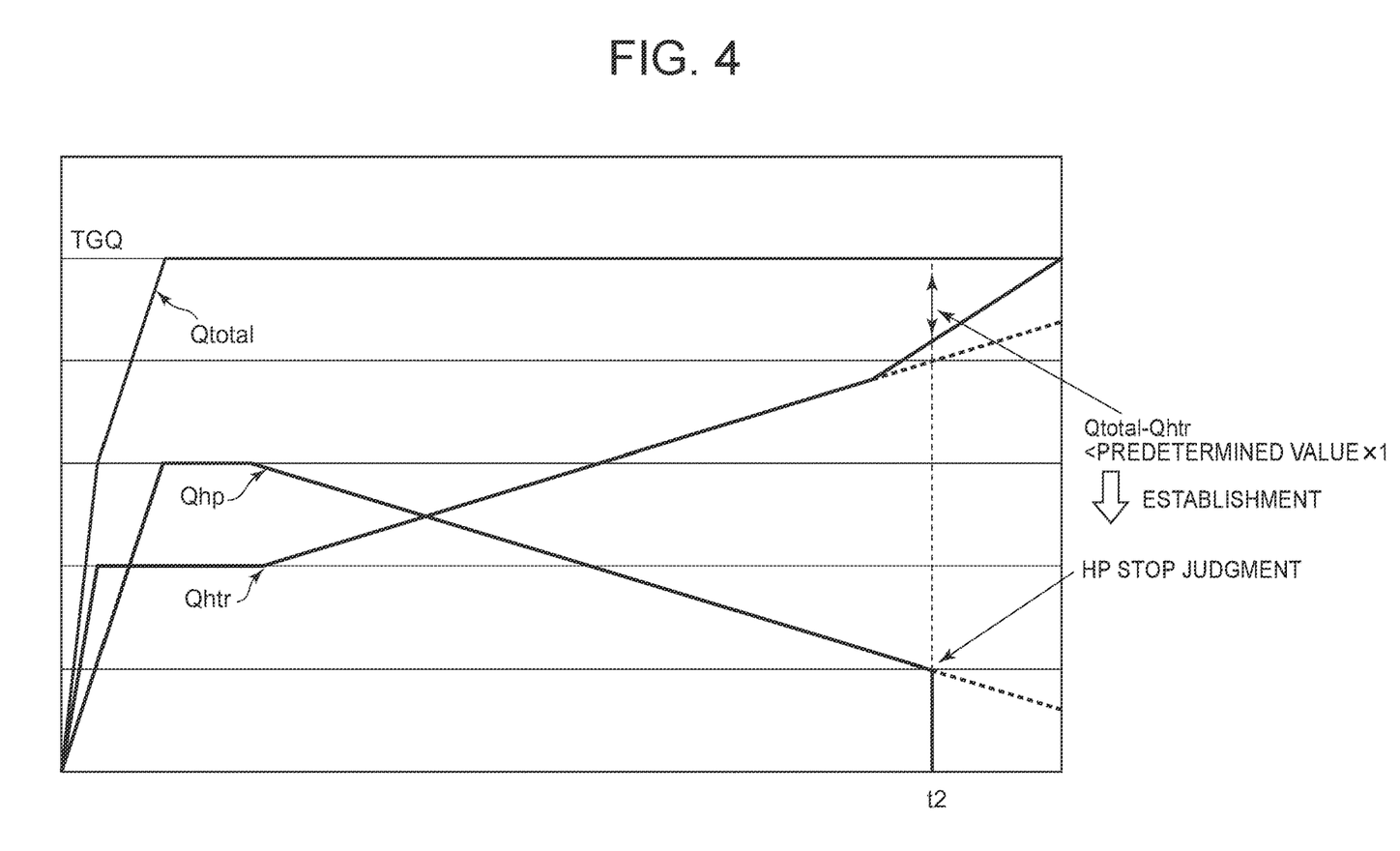
FIG. 4 is a diagram to explain another operation of judging the occurrence of the heat absorbing phenomenon in the radiator which is to be performed by the controller of FIG. 2.

Next, description will be made as to another operation of judging the occurrence of the heat absorbing phenomenon in the radiator 4, and control of the compressor 2 in this case, with reference to FIG. 4. In the case where an operation time of the heating mode elapses and the frost grows on the outdoor heat exchanger 7, or the like, the heating capability Qhp to be generated by the radiator 4 decreases as described above.

On the other hand, the electric heater 57 generates heat to compensate for the decrease of the heating capability Qhp of the radiator as described above, and hence when the heating capability Qhp of the radiator 4 decreases, the auxiliary heating capability Qhtr of the electric heater 57 eventually becomes larger than the heating capability Qhp of the radiator 4, and comes close to a total capability Qtotal (=Qhp+Qhtr) that is a total heating capability to be generated by the radiator 4 and the electric heater 57.

Here, when a difference between the total capability Qtotal and the auxiliary heating capability Qhtr is small, it is indicated that the heating capability Qhp to be generated by the radiator 4 decreases and there is a high possibility that the heat absorbing phenomenon occurs in the radiator 4. Therefore, in this example, the controller 32 calculates a difference (Qtotal−Qhtr) between the total capability Qtotal and the auxiliary heating capability Qhtr, always judges whether or not the difference (Qtotal−Qhtr) is smaller than the predetermined value X1 (e.g., 200 W), and stops the compressor 2, when it is judged that this condition ((Qtotal−Qhtr)<X1) is established at time t2 of FIG. 4 (HP stop judgment of FIG. 4). Afterward, the controller defines the required heating capability TGQhtr of the electric heater 57=the required heating capability TGQ, and controls the energization of the electric heater 57 so that the auxiliary heating capability Qhtr to be generated by the electric heater 57 reaches the required heating capability TGQhtr (a solid line Qhtr of FIG. 4).

In this way, when the heating capability Qhp of the radiator 4 decreases and there is the high risk that the radiator 4 falls in the situation of conversely absorbing heat from the air heated by the electric heater 57, the controller 32 stops the compressor 2 to eliminate the disadvantage that more power is wasted. Furthermore, the temperature of the air heated by the electric heater 57 similarly does not drop, and the comfortable heating of the vehicle interior is also acquired.

(6-5) Operation of Judging Occurrence of Heat Absorbing Phenomenon in Radiator 4 and Control of Compressor 2 (No. 3)

Next, description will be made as to still another operation of judging the occurrence of the heat absorbing phenomenon in the radiator 4, and control of the compressor 2 in this case, with reference to FIG. 5. In the case where the operation time of the heating mode elapses and the frost grows on the outdoor heat exchanger 7, or the like, the heating capability Qhp to be generated by the radiator 4 decreases as described above.

Then, the electric heater 57 generates heat to compensate for the decrease of the heating capability Qhp of the radiator 3 as described above, and hence when the heating capability Qhp of the radiator 4 decreases, the auxiliary heating capability Qhtr of the electric heater 57 eventually becomes larger than the heating capability Qhp of the radiator 4, and comes close to the total capability Qtotal (=Qhp+Qhtr) that is the total heating capability to be generated by the radiator 4 and the electric heater 57, and the heating capability Qhp (=Qtotal−Qhtr) that is a difference between the total capability and the auxiliary heating capability also decreases.

On the other hand, the controller 32 calculates a ratio (Qtotal−Qhtr)/Php of the difference (Qtotal−Qhtr) to a power consumption Php of the compressor 2. The ratio (Qtotal−Qhtr)/Php means a coefficient of performance (COP) of the compressor 2, and the controller always judges whether or not a condition ((Qtotal−Qhtr)/Php<X2) that the ratio (Qtotal−Qhtr)/Php is smaller than a predetermined value X2 of, for example, "1" is established. When the coefficient of the performance of the compressor 2 is smaller than "1", it is indicated that the heating capability Qhp to be generated by the radiator 4 decreases and there is the high possibility that the heat absorbing phenomenon occurs in the radiator 4.

Figure 5:
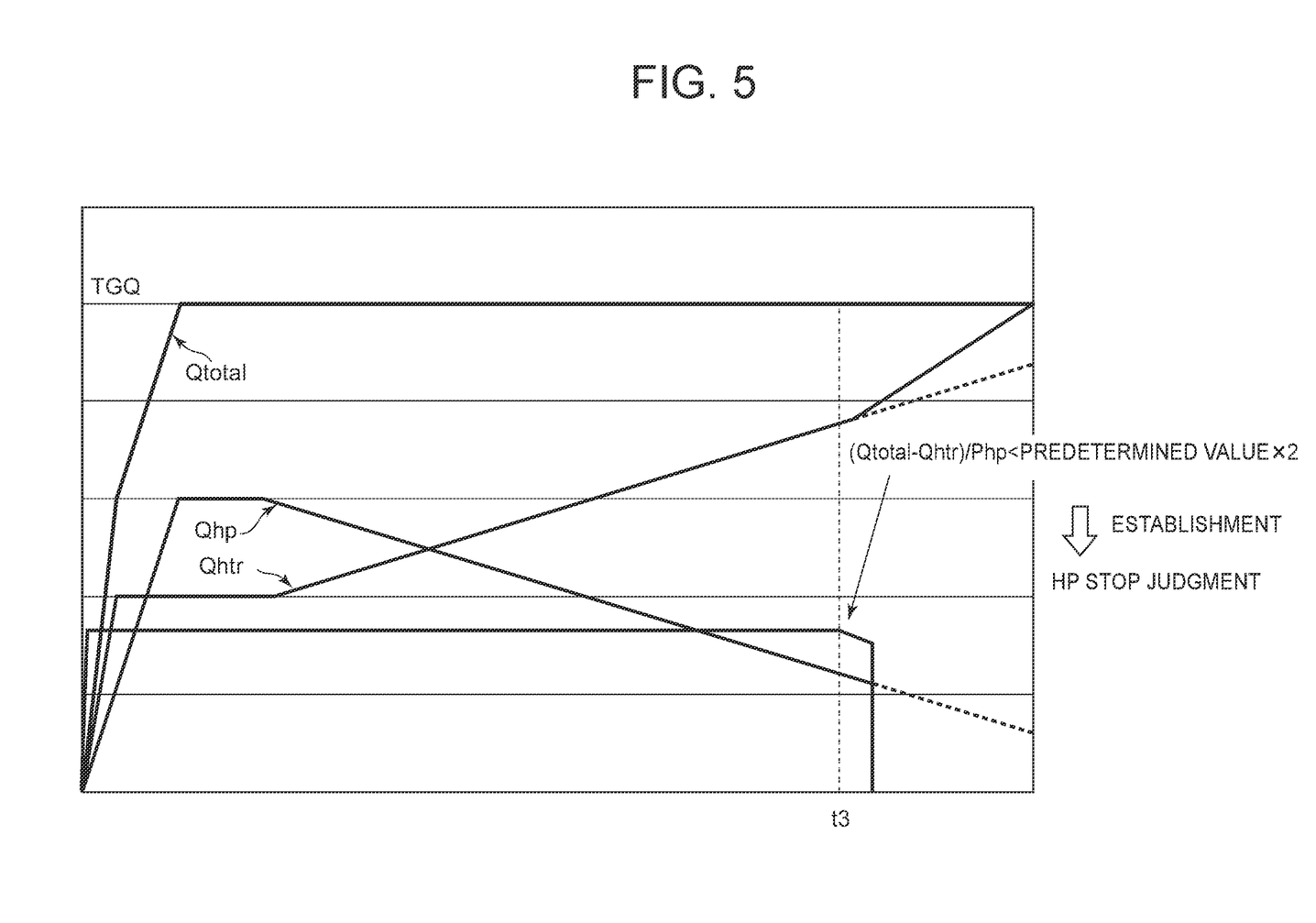
FIG. 5 is a diagram to explain still another operation of judging the occurrence of the heat absorbing phenomenon in the radiator which is to be performed by the controller of FIG. 2.

Then, when the controller 32 judges that this condition ((Qtotal−Qhtr)/Php<X2) is established at time t3 of FIG. 5, the controller stops the compressor 2 (HP stop judgment of FIG. 5). Afterward, the controller defines the required heating capability TGQhtr of the electric heater 57=the required heating capability TGQ, and controls the energization of the electric heater 57 so that the auxiliary heating capability Qhtr to be generated by the electric heater 57 reaches the required heating capability TGQhtr (a solid line Qhtr of FIG. 5).

Thus, also in this example, when the heating capability Qhp of the radiator 4 decreases and there is the high risk that the radiator 4 falls in the situation of conversely absorbing heat from the air heated by the electric heater 57, the controller 32 stops the compressor 2 to eliminate the disadvantage that more power is wasted. Furthermore, the temperature of the air heated by the electric heater 57 similarly does not drop, and the comfortable heating of the vehicle interior is also acquired.

(6-6) Operation of Judging Occurrence of Heat Absorbing Phenomenon in Radiator 4 and Control of Compressor 2 (No. 4)

Here, when the controller 32 judges any combination of two of the condition (Tcxin<TCI), the condition ((Qtotal−Qhtr)<X1) and the condition ((Qtotal−Qhtr)/Php<X2) or all of the conditions in the above respective examples, and judges that the combination is established or that all the conditions are established, the controller may judge that the heat absorbing phenomenon occurs in the radiator 4 and stop the compressor 2.

Consequently, the controller can more accurately judge that the heating capability Qhp of the radiator 4 decreases and that the radiator 4 falls in the situation of conversely absorbing heat from the air heated by the electric heater 57, and the controller can stop the compressor 2 to eliminate the disadvantage that more power is wasted. Furthermore, the temperature of the air heated by the electric heater 57 similarly does not drop, and the comfortable heating of the vehicle interior can be acquired.

(6-7) Operation of Judging Occurrence of Heat Absorbing Phenomenon in Radiator 4 and Control of Compressor 2 (No. 5)

Furthermore, in the above-mentioned examples, the controller stops the compressor 2 when each condition is established, but the present invention is not limited to the examples, the controller 32 may stop the compressor 2, when a state where each of the conditions is established continues for a predetermined time (e.g., 30 seconds or the like). In this way, the continuation for the predetermined time is added to the conditions, whereby it is possible to abolish erroneous judgment due to temporary variation, more accurately judge that the heating capability Qhp of the radiator 4 decreases and that the radiator 4 falls in the situation of conversely absorbing heat from the air heated by the electric heater 57, and stop the compressor 2.

(6-8) Operation of Judging Occurrence of Heat Absorbing Phenomenon in Radiator 4 and Control of Compressor 2 (No. 6)

Furthermore, it is preferable that the controller 32 does not judge the establishment of each of the above respective conditions in an early stage on startup of the compressor. For example, the controller does not judge the establishment of each of the above respective conditions until a predetermined time (e.g., two minutes or the like) elapses after the startup of the compressor 2. Consequently, it is possible to abolish the erroneous judgment in a situation where an operation state noticeably varies, and it is possible to more accurately judge the occurrence of the heat absorbing phenomenon by the radiator 4.

It is to be noted that in the embodiments, the present invention is applied to the air-conditioning apparatus for the vehicles 1 which changes and executes the respective operation modes of the heating mode, the dehumidifying and heating mode, the dehumidifying and cooling mode and the cooling mode, but the present invention is not limited to the embodiments, and the present invention is also effective for an air-conditioning apparatus which only performs the heating mode.

Furthermore, the constitution of the refrigerant circuit R or each numeric value described above in each embodiment does not restrict the present invention, and is changeable without departing from the gist of the present invention.

DESCRIPTION OF REFERENCE NUMERALS 1 air-conditioning apparatus for vehicles
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
26 suction changing damper
27 indoor blower (a blower fan)
28 air mix damper
32 controller (a control means)
57 electric heater (an auxiliary heating means)
R refrigerant circuit

The invention claimed is:
1. An air-conditioning apparatus for vehicles, comprising:
a compressor to compress a refrigerant;
an air flow passage through which air to be supplied to a vehicle interior flows;
a radiator disposed in the air flow passage to let the refrigerant radiate heat, thereby heating the air to be supplied to the vehicle interior;
an outdoor heat exchanger disposed outside the vehicle interior to let the refrigerant absorb heat; and
a control means,
so that the control means lets the refrigerant discharged from the compressor radiate heat in the radiator, decompresses the refrigerant from which the heat has been radiated, and then lets the refrigerant absorb heat in the outdoor heat exchanger to heat the vehicle interior,
the air-conditioning apparatus for the vehicles, comprising:

an auxiliary heating means disposed on an upstream side of the air flowing through the air flow passage to the radiator, wherein the control means executes a cooperative operation of heating the air to be supplied to the vehicle interior by the auxiliary heating means and the radiator, and stops the compressor on the basis of establishment of a condition that an inlet refrigerant temperature Tcxin of the radiator is lower than an outlet refrigerant temperature TCI of the radiator.

2. An air-conditioning apparatus for vehicles, comprising:
a compressor to compress a refrigerant;
an air flow passage through which air to be supplied to a vehicle interior flows;
a radiator disposed in the air flow passage to let the refrigerant radiate heat, thereby heating the air to be supplied to the vehicle interior;
an outdoor heat exchanger disposed outside the vehicle interior to let the refrigerant absorb heat; and
a control means,
so that the control means lets the refrigerant discharged from the compressor radiate heat in the radiator, decompresses the refrigerant from which the heat has been radiated, and then lets the refrigerant absorb heat in the outdoor heat exchanger to heat the vehicle interior,
the air-conditioning apparatus for the vehicles, comprising:
an auxiliary heating means disposed on an upstream side of the air flowing through the air flow passage to the radiator,
wherein the control means executes a cooperative operation of heating the air to be supplied to the vehicle interior by the auxiliary heating means and the radiator, and
stops the compressor on the basis of establishment of a condition that a difference between a total capability Qtotal that is a total heating capability to be generated by the radiator and the auxiliary heating means and an auxiliary heating capability Qhtr that is a heating capability to be generated by the auxiliary heating means is smaller than a predetermined value X1.

3. An air-conditioning apparatus for vehicles, comprising:
a compressor to compress a refrigerant;
an air flow passage through which air to be supplied to a vehicle interior flows;
a radiator disposed in the air flow passage to let the refrigerant radiate heat, thereby heating the air to be supplied to the vehicle interior;
an outdoor heat exchanger disposed outside the vehicle interior to let the refrigerant absorb heat; and
a control means,
so that the control means lets the refrigerant discharged from the compressor radiate heat in the radiator, decompresses the refrigerant from which the heat has been radiated, and then lets the refrigerant absorb heat in the outdoor heat exchanger to heat the vehicle interior,
the air-conditioning apparatus for the vehicles, comprising:
an auxiliary heating means disposed on an upstream side of the air flowing through the air flow passage to the radiator, wherein the control means executes a cooperative operation of heating the air to be supplied to the vehicle interior by the auxiliary heating means and the radiator, and stops the compressor on the basis of establishment of a condition that a ratio of a difference between a total capability Qtotal that is a total heating capability to be generated by the radiator and the auxiliary heating means and an auxiliary heating capability Qhtr that is a heating capability to be generated by the auxiliary heating means to a power consumption Php of the compressor is smaller than a predetermined value X2.

4. An air-conditioning apparatus for vehicles, comprising:
a compressor to compress a refrigerant;
an air flow passage through which air to be supplied to a vehicle interior flows;
a radiator disposed in the air flow passage to let the refrigerant radiate heat, thereby heating the air to be supplied to the vehicle interior;
an outdoor heat exchanger disposed outside the vehicle interior to let the refrigerant absorb heat; and
a control means,
so that the control means lets the refrigerant discharged from the compressor radiate heat in the radiator, decompresses the refrigerant from which the heat has been radiated, and then lets the refrigerant absorb heat in the outdoor heat exchanger to heat the vehicle interior,
the air-conditioning apparatus for the vehicles, comprising:
an auxiliary heating means disposed on an upstream side of the air flowing through the air flow passage to the radiator,
wherein the control means executes a cooperative operation of heating the air to be supplied to the vehicle interior by the auxiliary heating means and the radiator, and
stops the compressor on the basis of establishment of one of:
a condition that an inlet refrigerant temperature Tcxin of the radiator is lower than an outlet refrigerant temperature TCI of the radiator,
a condition that a difference between a total capability Qtotal that is a total heating capability to be generated by the radiator and the auxiliary heating means and an auxiliary heating capability Qhtr that is a heating capability to be generated by the auxiliary heating means is smaller than a predetermined value X1, and
a condition that a ratio of a difference between the total capability Qtotal that is the total heating capability to be generated by the radiator and the auxiliary heating means and the auxiliary heating capability Qhtr that is the heating capability to be generated by the auxiliary heating means to a power consumption Php of the compressor is smaller than a predetermined value X2, or
any combination of the conditions.

5. The air-conditioning apparatus for the vehicles according to any one of claims 1 to 4,
wherein the auxiliary heating means is a PTC heater.

6. The air-conditioning apparatus for the vehicles according to any one of claims 1 to 4,
wherein in the cooperative operation, the control means compares a required heating capability TGQ that is a heating capability to be required for the radiator with a heating capability Qhp to be generated by the radiator, and complements a shortage of the heating capability Qhp to the required heating capability TGQ with the heating of the auxiliary heating means.

7. The air-conditioning apparatus for the vehicles according to any one of claims 1 to 4,
wherein the control means stops the compressor, when a state where the condition or one of the conditions is established continues for a predetermined time.

8. The air-conditioning apparatus for the vehicles according to claim 4,
wherein the control means does not judge the establishment of one of the conditions until a predetermined time elapses after the startup of the compressor.

* * * * *